United States Patent [19]

Goodenough et al.

[11] Patent Number: 5,068,788

[45] Date of Patent: Nov. 26, 1991

[54] QUANTITATIVE COMPUTED TOMOGRAPHY SYSTEM

[75] Inventors: David J. Goodenough, Myersville; Charles Stockham, Columbia, both of Md.

[73] Assignee: Columbia Scientific Inc., Columbia, Md.

[21] Appl. No.: 277,269

[22] Filed: Nov. 29, 1988

[51] Int. Cl.$^5$ ............................................. G06G 7/60
[52] U.S. Cl. .................................. 364/413.14; 378/207; 382/18; 382/53
[58] Field of Search ...................... 364/413.14; 378/18, 378/207, 901; 128/781; 382/8, 51, 53

[56] References Cited

U.S. PATENT DOCUMENTS

| | | | |
|---|---|---|---|
| 4,663,772 | 5/1987 | Mattson et al. | 378/18 |
| 4,731,863 | 3/1988 | Sezan et al. | 382/51 |
| 4,788,706 | 11/1988 | Jacobson | 378/207 |
| 4,804,842 | 2/1989 | Nakajima | 250/327.2 |
| 4,856,528 | 8/1989 | Yang et al. | 128/653 |
| 4,873,707 | 10/1989 | Robertson | 378/18 |

OTHER PUBLICATIONS

Stockham et al., Abstract entitled "A Computer Program for the Reproducible Determination of Tissue CT Number", Radiology, vol. 165, (P.) Suppl. RSNA Scientific Program, Nov., 1987.

Anonymous, "QCT and DPA in Osteoporosis", published by Lunar Radiation Corporation, 1986.

Goodsitt et al., "Quantitative Computed Tomography Scanning for Measurement of Bone and Bone Marrow Fat Content A Comparison of Single-and Dual-Energy Techniques Using a Solid Synthetic Phantom", *Investigative Radiology*, vol. 22, pp. 799-810, Oct. 1987.

Anonymous, *Columbia Scientific Incorporated Newsletter*, vol. 2, No. 2, No., 1987.

*Primary Examiner*—Jerry Smith
*Assistant Examiner*—Steve Kibby
*Attorney, Agent, or Firm*—Bacon & Thomas

[57] ABSTRACT

A method for measuring the CT numbers of an in vivo tissues includes the steps of calculating a histogram of a region including the tissue, locating a leading edge of a peak within the histogram, substracting CT numbers assumed to result from background and intermixing of tissues, fitting the background-substracted peak to a gaussian distribution, and calculating the mode of the resulting peak. Whe the CT numbers of two different tissues having know densities are measured according to the method of the invention, the CT numbers may be used to obtain a standard for analyzing tissues of unknow density. The method can be implemented by means of a CT scanner, a computer, and appropriate software.

20 Claims, 4 Drawing Sheets

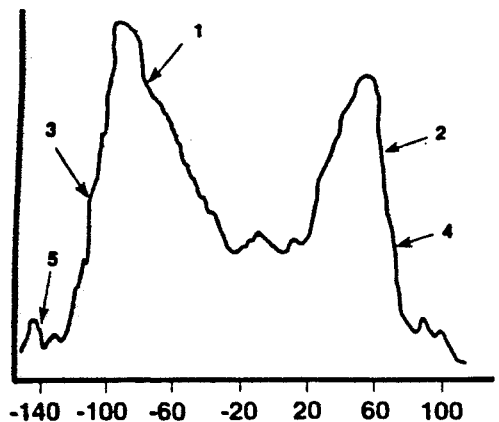
FIG. IA
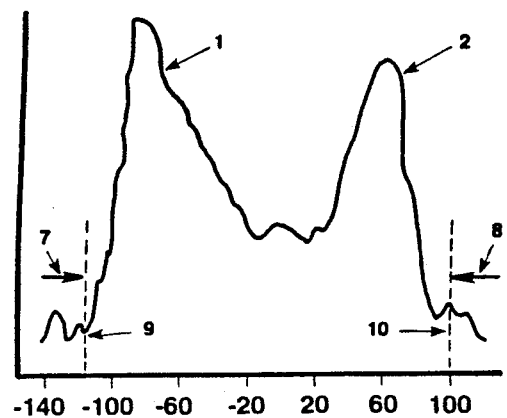
FIG. IB
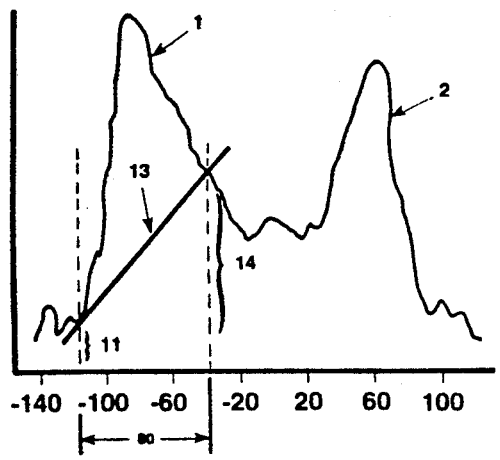
FIG. IC
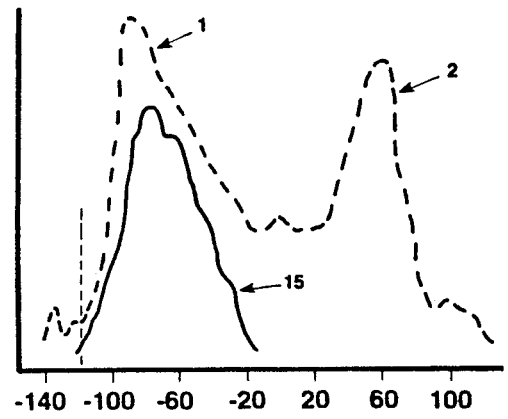
FIG. ID
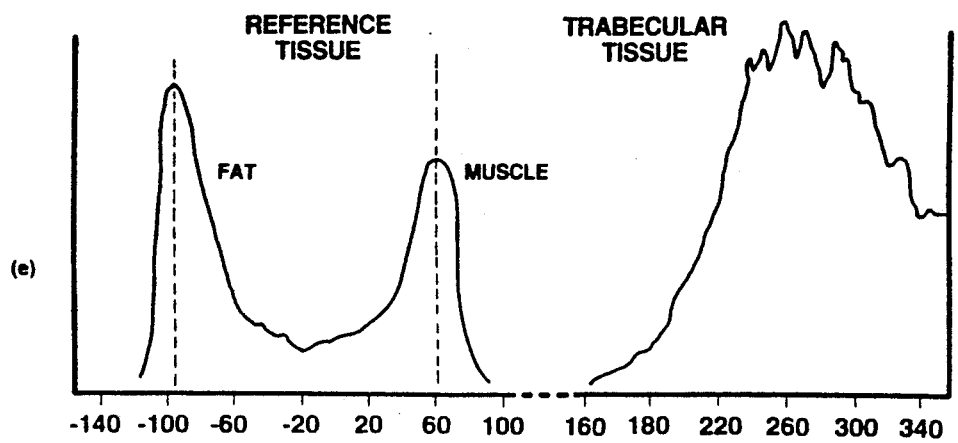
FIG. IE

QUANTITATIVE COMPUTED TOMOGRAPHY SYSTEM

BACKGROUND OF THE INVENTION

1. Field of the Invention

This invention relates to the field of quantitative computed tomography and, in particular, to a system for reproducibly measuring the CT number of in vivo tissue samples.

2. Description of the Related Art

Computed Tomography (CT) was developed as a method for qualitatively analyzing soft tissues by non-invasively obtaining three-dimensional pictures of affected areas in a patient. Diagnosis of many pathological conditions, however, requires quantitative analysis of the affected organs or tissues. This has historically necessitated painful and often dangerous invasive methods of obtaining tissue samples for in vitro analysis, for example to determine the relative density or composition of the affected organs.

Because of the non-invasiveness of CT analysis and the ability to scan a precise three-dimensional cross section of the patient, it has been proposed to use the data resulting from a CT scan quantitatively as well as qualitatively.

One type of condition recognized as suitable for quantitative CT analysis is osteoporosis. Osteoporosis evaluation involves the measurement of bone mineral density in affected spinal tissues. However, quantitative CT analysis of osteoporosis has suffered from practical disadvantages which have severely limited its accuracy, despite the potential advantages obtained by such non-invasive quantitative CT analysis, and the widespread availability of CT scanners.

The primary problem in utilizing quantitative CT analysis has been calibration of the CT numbers obtained in a CT scan to account for patient variability and positioning of the patient. The attenuation of the X-ray spectrum used in a CT scan is affected not only by tissues in the region of interest, for example a particular vertebra, but also by the thickness and density of tissues around the region of interest which also attenuate the X-ray beam. Since the density of the affected bone tissues is itself variable, it is not possible to calibrate the CT scan without an additional reference.

Recently, attempts have been made to correct for the problem of CT number variability of a tissue situated in a heterogeneous surrounding of other tissues by providing a reference, known as a "phantom", located in the path of the CT scan but external to the patient. Such reference "phantoms" have been partially successful in accounting for effects of X-ray beam "hardening" and scatter that are correlated with patient variability, but are nevertheless subject to such problems as local differences in X-ray spectra and in scatter distribution between the phantom and the target tissue, variations resulting from patient movement with respect to the reference phantom, and volume averaging difficulties resulting from the current practice of taking the mean of the CT distribution.

In order to overcome the problems associated with the use of external reference phantoms, it has been suggested that internal reference tissues located near the affected tissues could be utilized. Potential in vivo reference tissues include fat and muscle, whose relatively invariable densities and close proximity to vertebral bone tissues make them suitable candidates for use in calibrating CT scans without the need for external reference phantoms.

However, it has heretofore been impossible to reproducibly obtain meaningful CT numbers for in vivo fat and muscle tissues because no method has been available for eliminating the inevitable effects of fat and muscle tissue mixing, and to account for the nonuniform distribution of such tissues throughout the CT slice.

Any quantitative distribution obtained from a CT scan for areas of fat and muscle will invariably include areas representing fat and muscle mixtures, as well as background from other tissues in the path of the scan. Because the mixing is essentially random, CT numbers representing such mixtures are of no use in deriving a reference standard for correlating CT numbers with tissue density.

SUMMARY OF THE INVENTION

The invention provides a method and means for solving the problems of the prior art by providing a way of analyzing a suitably chosen CT number histogram to delete the effects of background scatter and intermixing of tissues.

CT numbers of individual tissues are obtained by locating leading edges of histogram distribution curves in regions of the histogram representing the individual tissues. The leading edge values are used as a starting point for construction of model curves representative of pure tissue samples against which the actual histogram distribution can be measured, for example by calculating and adjusting moments of the curve, following subtraction of assumed values for background and intermixing derived from the leading edge values. The adjusted CT numbers are used to create a reference plot by which other CT numbers can be converted to a physical quantity such as density for use in analyzing other tissues.

BRIEF DESCRIPTION OF THE DRAWINGS

FIGS. 1(a) through 1(e) illustrate the process by which a meaningful curve is obtained from an initial histogram distribution.

DESCRIPTION OF THE PREFERRED EMBODIMENT

Figure 2A:
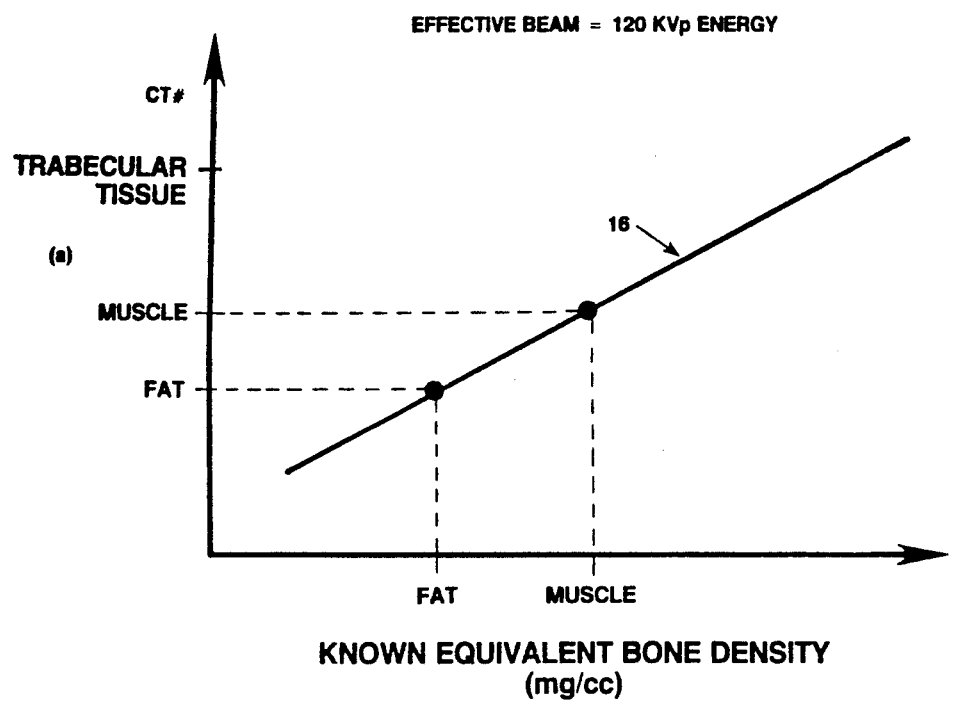
FIGS. 2(a) and 2(b) illustrate the process of converting CT numbers to known quantities for use as a reference standard.
Figure 2B:
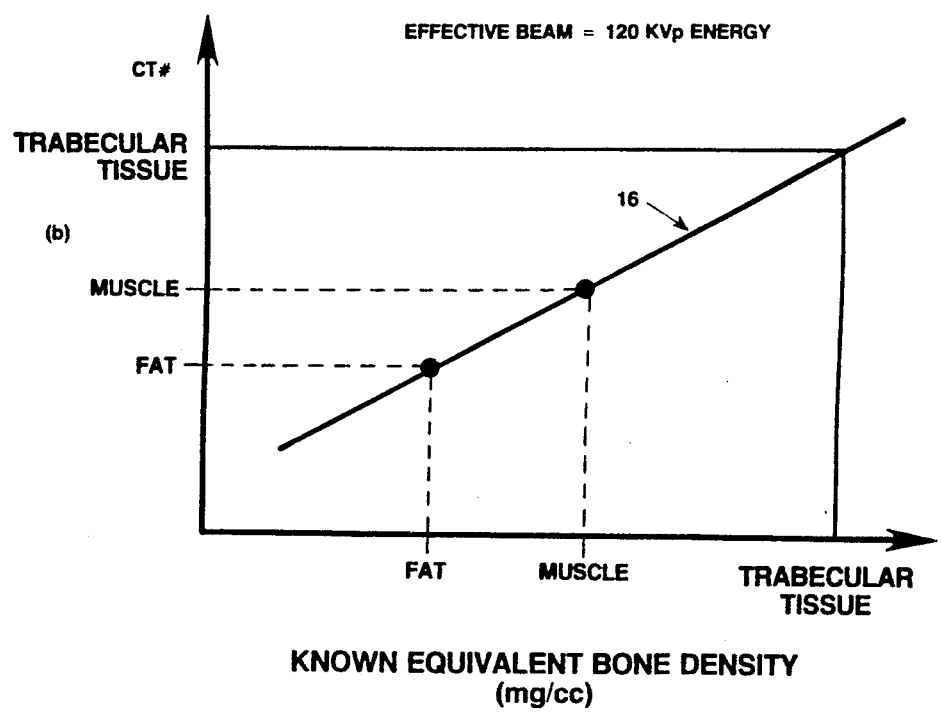
Figure 3A:
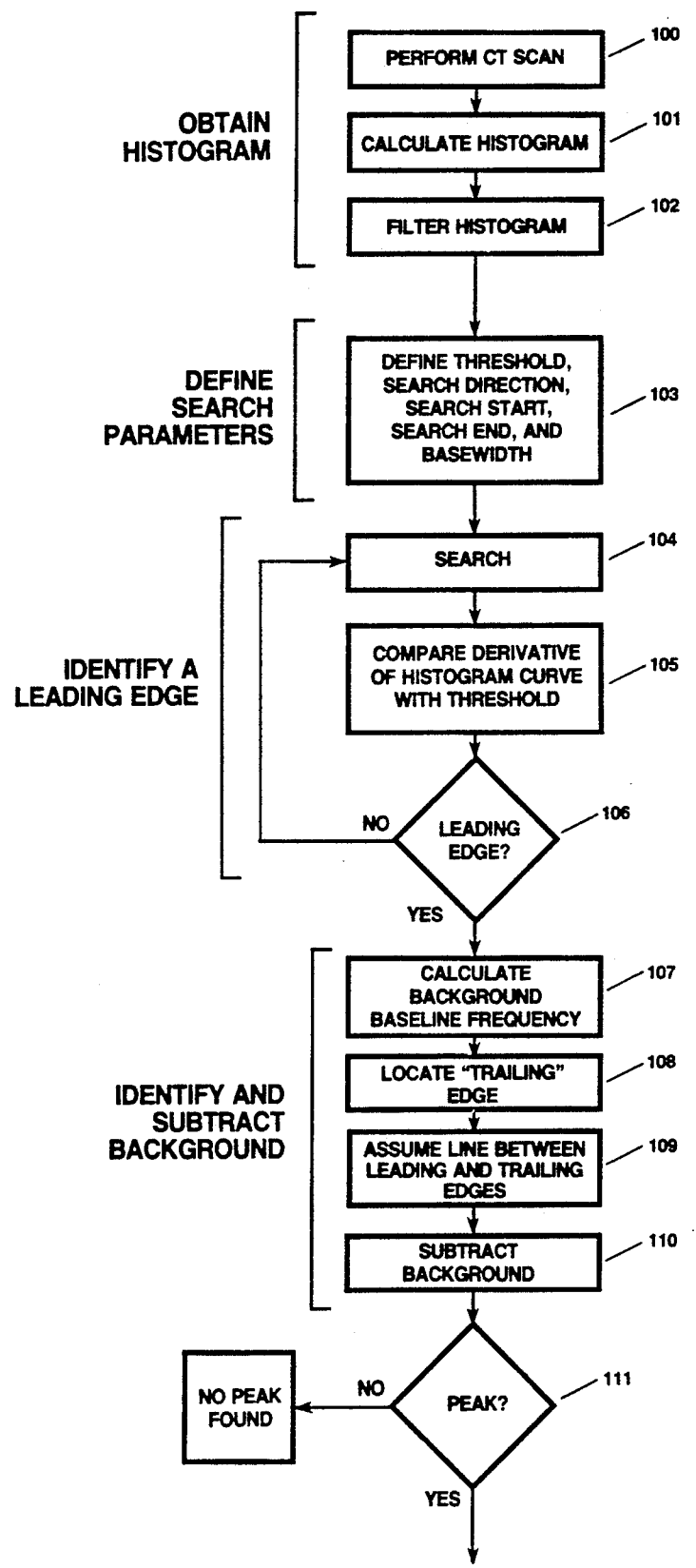
FIGS. 3(a) and 3(b) are flowcharts detailing the method of the preferred embodiment.
Figure 3B:
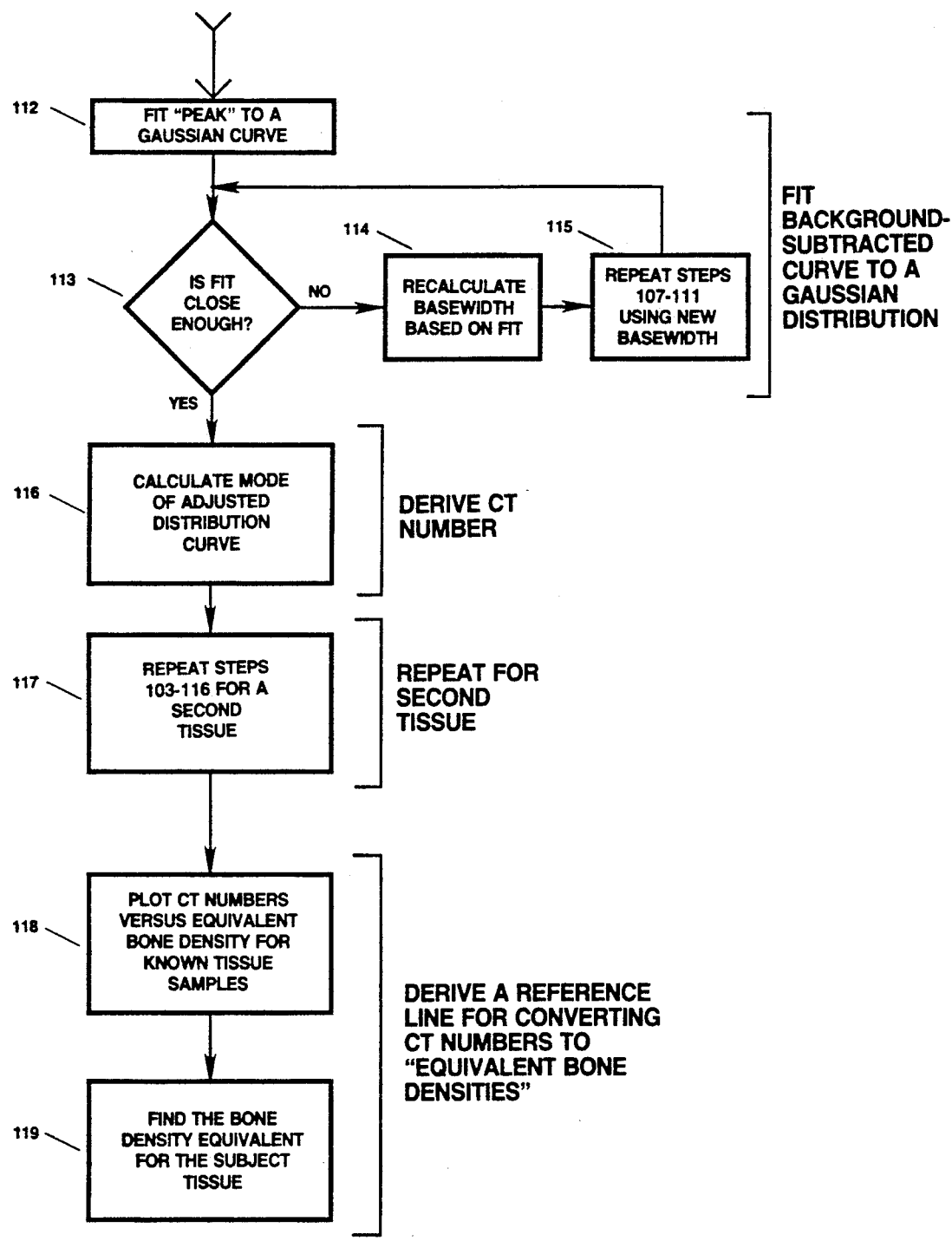

FIGS. 1(a) to 1(e) and FIGS. 2(a) and 2(b) illustrate the effects of implementing the preferred method, shown in FIGS. 3(a) and 3(b). Each of the method steps is implemented by means of appropriate software and hardware associated with a CT scanner.

The first step (100) is to take a CT scan which includes an affected vertebra and proximate regions of fat and muscle tissue. The region of interest is selected to include as high a percentage of fat and muscle in the area of the affected bone tissue as possible. A physician or qualified lab technician will be able to select a likely region for analysis and enter the spatial parameters of the three-dimensional region into a computer. The higher the percentage of fat and muscle in the defined area, the more accurate the calibration.

The computer then calculates a histogram of the pixel values resulting from the CT scan of the selected region, as indicated by step 101. The pixel values correspond to "CT numbers" which represent x-ray beam attenuation by the various tissues in the path of the beam.

At this point, histogram values which are clearly the result of system errors and background effects can be filtered out by averaging the histogram over groups of adjacent CT numbers to eliminate sharp discontinuities in the histogram, as indicated by step 102.

FIG. 1(a) shows an exemplary filtered histogram of CT number distribution in the area of a vertebra. The distribution of CT number frequencies results not only from individual fat and muscle tissues, but also from the inevitable mixing of fat and muscle, as well as the effects of attenuation and scatter of the X-ray by surrounding body tissues. Actual histograms will, of course, vary from patient to patient and according to the type of scanner employed.

In a preferred embodiment of the invention, separated muscle and fat CT numbers are derived from this histogram for use in analyzing the vertebral tissues. The CT numbers obtained are then plotted against known density values for fat and muscle to obtain a CT number versus density reference curve 16, shown in FIG. 2(b). The manner in which the reference curve is obtained will be described in detail below, but first a description of the method by which the adjusted curves are obtained will be given.

After obtaining a filtered histogram, the search parameters for locating fat and muscle CT numbers for the histogram must be defined (step 104). This is accomplished by recognizing certain general characteristics of such histograms. As shown in FIG. 1(a), the CT number for fat clearly lies in the area of the histogram curve designated by reference numeral 1 and having CT numbers of between approximately −140 and −20, while the CT numbers for muscle lie between approximately 20 and 100. It has been found that, depending on the scanner, the above-mentioned ranges will account for virtually all spinal muscle and fat peaks. Thus, the search is defined to include those areas of the histogram, as will be explained in more detail below.

Furthermore, the search routine makes use of the fact that, in the absence of background effects and intermixing, the fat and muscle distributions would be separate "gaussian" curves.

The effects of background attenuation and scatter can be seen in the non-zero CT number frequencies in areas along the CT number axis outside of the "fat" and "muscle" areas, and the influence of mixing is found in the deviation of the distributions from a "delta" or gaussian distribution. This is especially true on the right side of the fat "peak" and on the left side of the muscle "peak", as shown in FIG. 1(a), because the CT number, range for muscle is located to the right of the range for fat.

The basic approach of the invention is to calculate the deviation of the actual CT number distribution curve from the theoretical gaussian curves representing pure fat and muscle by locating the leading edges of the respective fat and muscle curves. This is important because these are the areas least likely to be affected by intermixing. As shown in FIG. 1(a), the left side 3 of the fat distribution is defined to be a "leading" edge, while the right side 4 of the muscle distribution is defined to also be a "leading" edge.

The base of a leading edge is determined by searching for areas at which the slope of the curve exceeds a threshold slope for a sufficient number of samples. This is because spikes in the background will create false slopes, as indicated by reference numeral 5 in FIG. 1(a).

In order to locate the leading edges, the search parameters must be defined, as noted above. The most critical search parameters are, in no particular order, threshold, search start, search direction, search end, and base width.

The first parameter mentioned, "threshold" is a minimum slope expected to be indicative of the beginning of a peak. The threshold is defined according to the size of the region of interest. The larger the region of interest, the smaller the slope deemed necessary to define a peak.

The search start is defined to be outside of the CT number region of the histogram in which potential fat and muscle peaks have been observed to lie. In the histogram illustrated in FIG. 1, a search start for fat is chosen as a number less than −140 and a search start for muscle is chosen as a number greater than +100, illustrated in FIG. 1.

It should be noted that by starting the search outside of the area of the histogram which includes the target tissue, an important advantage is obtained over possible alternative methods of analysis. This is because the search does not require a precise starting point, as would be the case if one attempted to immediately inscribe the highest probability fat and muscle areas in order to obtain a mean CT number. The search at this point is merely for "leading" edges, and not for exact muscle or fat locations.

The search direction is then selected, for example in terms of a search "increment". In the preferred embodiment, a search increment for fat of +1 means that the search will retrieve each CT number frequency for analysis, moving to the right along the histogram as indicated by arrow 7 in FIG. 1(b). Similarly, the search increment for muscle would be negative as indicated by arrow 8.

An end search point is also selected as part of step 103. If the search proceeds beyond the point at which a leading edge is likely to be found, the search is terminated. In the illustrated histogram, +20 would be a reasonable endpoint for a muscle search, while 60 would be a reasonable endpoint for a fat search.

Finally, a "basewidth" is selected. The "basewidth" essentially is the width at twenty percent of the height of an ideal pure fat or muscle histogram distribution. For both fat and muscle, the base width is selected to be 80 for the histogram shown in FIG. 1. This "basewidth" will be used to locate a presumed trailing edge for further analysis.

Once the search parameters have been selected and defined as variables in the computer program, the search begins (step 104). As the histogram values are retrieved from a memory buffer, the derivative of the distribution curve is calculated and compared with the "threshold" (step 105). If the derivative exceeds the threshold for a sufficient number of increments, a leading edge is deemed to be detected (step 106).

Once the location of the leading edge is established, the CT number frequency to the left of the curve is used to establish a baseline indicative of the background contribution at the leading edge. As noted above, if the fat and muscle CT numbers were not effected by background effects, the baseline would be zero.

Furthermore, if there were no background or fat and muscle mixing, the frequency on the trailing side of the curve would theoretically be zero. The method of the invention assumes that the effects of tissue mixing linearly decrease across the peak, and everything below the theoretical base of the base of the peak is in effect deleted.

The baseline contribution of background effects is determined, in effect, by taking the frequency value or height 11 (See FIG. 1(c)) of the curve at the leading edge (step 107). The height of the leading edge would be zero if no background and no mixing were present. To ensure a more accurate value for the background baseline, an average of values immediately preceding the leading edge may be taken.

The value of the "basewidth", described above, is then added to the CT number of the leading edge to locate an assumed trailing edge (step 108). Again, it is presumed that the height of the trailing edge would be zero in the case of a pure tissue sample with no background or tissue intermixing.

At this time, the presumption that the effects of intermixing of the CT numbers decrease linearly from the trailing edge to the leading edge is utilized. The height of the trailing edge minus the height of background baseline is taken to reflect the amount of tissue intermixing at the trailing edge of the tissue "peak".

Essentially, in steps 109 and 110, a line is drawn from the leading to the trailing edge, and everything below the line is deleted from the histogram. This is done by calculating the slope which such a line would follow, incrementing along the X-axis and subtracting the base line value plus the Y-value from the Y-value of the histogram curve (for example, if the histogram curve is defined by the function $f(x)$, the slope of the line is m, and the base line value is b, then the subtracted curve $f'(x)$ would be given by $f'(x) = f(x) - (mx + b)$).

The result is a uniquely adjusted histogram curve which substantially eliminates the effects of both background and intermixing. The same process of background subtraction, using appropriate search parameters, is performed for both fat and muscle regions of the histogram. By drawing a line as described for the fat region, the effect of intermixing is extracted, making accessible as much of the intermixed fat CT numbers as possible for subsequent analysis, together with the CT numbers representative of fat tissue in the pure fat region of the histogram, indicated by the portion of the fat curve which is above the line. Similarly, by drawing the line in the muscle region of the histogram, a corresponding extraction of the effect of intermixing occurs, resulting in a separation of the intermixed muscle CT numbers for subsequent analysis.

The background-subtracted curve is then subjected to a curve fitting algorithm (step 112) to determine its deviation from a true gaussian curve. As explained above, the parameters or "moments" of the gaussian curve are indicative of the parameters of a curve uninfluenced by surrounding tissue and tissue intermixing. In step 116, the mode of the curve is selected on the basis of this analysis, and taken to be the measured CT number for use in calibrating the scanner.

A variety of statistical analysis techniques are known which may be used to analyze the curve for fit and to find the mode. It is also possible to analyze the curve in terms of other gaussian moments, although no other moment is believed to be as meaningful as the mode, which is the CT number of highest frequency.

The specific preferred method of analysis is the "chi-squared" test, details of which are known to those skilled in the art and form no part of this invention. Once the curve has been transferred to "chi-squared space," its width, defined to be the width of the curve at 20% of its height, is compared with a theoretically acceptable width, for example the above-described basewidth, and the curve is rejected if it is not deemed to be representative of pure fat or muscle.

The width obtained during the curve fitting analysis can then be substituted for the originally presumed base width, and the process of subtraction can be repeated in an iterative process for greater accuracy (step 115). FIG. 1(e) shows the results of the iterative process and also includes a histogram of trabecular tissue for comparison.

It is also possible to use parameters other than the base width for analyzing whether the curve is acceptable. For example, the actual slope of the leading edge may be a more reliable indicator of the acceptability of the curve than the width.

Once a CT number for fat and muscle has been obtained, the numbers may be used to obtain a calibrated plot of CT number versus density (step 118). Referring to FIGS. 2(a) and 2(b), the CT numbers are plotted along the Y-axis of a graph of CT number versus "equivalent bone density." The equivalent bone densities of both muscle and fat are known and are plotted along the X-axis of the graph. A line 16 is then drawn which shows the relationship between measured CT number and equivalent bone density.

The equivalent bone densities will of course be different depending on the energy of the scanning beam. Also, it is noted that while the preferred equivalent bone densities are expressed in units of mg/cc of cortical bone, numerous other units of equivalent bone density are also known.

As shown in FIG. 2(b), line 16 can then be used to obtain the equivalent bone density of the subject trabecular tissue.

The resulting density values are highly reproducible, and are not dependent on precise positioning of the patient, unlike values obtained by prior art methods. Reproducibility studies on 33 images with intentional region of interest mispositioning of 1.5 to 2.5 mm yielded a sample standard deviation of 1-2 CT numbers for trabecular bone. This translates to a precision of better than 1% for normal and 1-2% for osteoporotic patients. Prior art methods yielded a reproducibility error slightly less than 2% for normal patients and as high as 3-4% for osteoporotic patients.

In conclusion, the invention provides a useful tool for convenient, reliable derivation of quantitative CT values for an in vivo tissue. The tool does not require external calibration phantoms, and is therefore practical for clinical use. The invention permits a significant improvement in reproducibility due to the decreased dependence on patient positioning.

It is contemplated that the method and means of the invention will also be applicable to the evaluation of conditions involving such tissues as lung, kidney, or liver tissues, and to tumor evaluation. Numerous other modifications will also occur to those skilled in the art. Therefore, the invention is not to be limited to the described embodiment but is to be defined solely by the appended claims.

We claim:

1. A method for non-invasively determining the density of a selected tissue without using an external reference, comprising the steps of:
   selecting a tissue;
   selecting a scan region which includes said tissue;

entering spatial parameters of the three-dimensional scan region into a computer;

performing a computed tomography scan of said scan region;

quantitatively determining the effects of said selected tissue on data obtained by performing said computed tomography scan, said step of quantitatively determining effects comprising the steps of:

calculating a histogram of computed tomography numbers obtained from said computed tomography scan of said scan region which includes said tissue;

identifying a peak within said histogram by locating its leading edge;

determining whether a first moment of said peak is within predetermined limits;

adjusting the peak to obtain an adjusted peak by varying said first moment to fit within said predetermined limits; and calculating a second moment of the peak, said second moment being indicative of the computed tomography number of said selected tissue.

2. A method as claimed in claim 1, wherein said tissue is either fat or muscle.

3. A method as claimed in claim 1, further comprising the steps of selecting a peak search starting point and direction such that the peak is identified by locating an edge of the peak which is least likely to be affected by tissue mixing.

4. A method as claimed in claim 1, further comprising the steps of subtracting from said histogram computed tomography numbers which result from the effects of background and extracting the effects of tissue intermixing.

5. A method as claimed in claim 4, wherein said completed tomography numbers are subtracted by locating bases of leading and trailing edges of the peak, and subtracting those computed tomography numbers which correspond to the area of the peak which lies below a line connecting said bases of said leading and trailing edges.

6. A method as claimed in claim 1, wherein said first moment is the bandwidth of said peak.

7. A method as claimed in claim 1, wherein said second moment is the mode of said peak.

8. A method as claimed in claim 1, further comprising the steps of identifying a second peak within said histogram, determining whether a first moment of said second peak is within predetermined limits, adjusting the second peak to obtain a second adjusted peak by varying said first moment to fit within said predetermined limits, and calculating a second moment of the second peak, said second moment of said second peak being indicative of computed tomography number representing a second tissue.

9. A method as claimed in claim 8, further comprising the steps of plotting said computed tomography number of said selected tissue and said computed tomography number representing a second tissue on one coordinate axis of a reference graph, and plotting known values of a physical parameter of said selected and second tissues on a second coordinate axis of said reference graph is order to obtain a reference line which can be used to find unknown values of said physical parameter according to computed tomography number.

10. A method as claimed in claim 9, wherein said physical parameter is density.

11. A system for non-invasively determining the density of a selected tissue without using an external reference, comprising:

means for selecting a scan region which includes said tissue;

a computed tomography scanner;

means for entering spatial parameters of the three-dimensional scan region into a computer;

means for determining the effects of said selected tissue on data obtained from said computed tomography scanner; said means comprising:

means for calculating a histogram of computed tomography numbers obtained from a computed tomography scan of a scan region which includes said tissue;

means for identifying a peak within said histogram by locating its leading edge;

means for determining whether a first moment of said peak is within predetermined limits;

means for adjusting the peak to obtain an adjusted peak by varying said first moment to fit within said predetermined limits; and means for calculating a second moment of the peak, said second moment being indicative of the computed tomography number of said selected tissue.

12. A system as claimed in claim 11, wherein said tissue is either fat or muscle.

13. A system as claimed in claim 11, further including means for selecting a peak search starting point and direction such that the peak is identified by locating an edge of the peak which is least likely to be affected by tissue mixing.

14. A system as claimed in claim 11, further including means for subtracting computed tomography numbers from said histogram which result form the effects of background and extracting the effects of tissue intermixing.

15. A system as claimed in claim 14, further including means for subtracting said computed tomography numbers by locating bases of leading and trailing edges of the peak, and means for subtracting those computed tomography numbers which correspond to the area of the peak which lies below a line connecting said bases of said leading and trailing edges.

16. A system as claimed in claim 11, wherein said first moment is the bandwidth of said peak.

17. A system as claimed in claim 11, wherein said second moment is the mode of said peak.

18. A system as claimed in claim 11, further including means for identifying a second peak within said histogram, determining whether a first moment of said second peak is within predetermined limits, adjusting the second peak to obtain a second adjusted peak by varying said first moment to fit within said predetermined limits, and calculating a second moment of the second peak, said second moment of said second peak being indicative of computed tomography number representing a second tissue.

19. A system as claimed in claim 18, further including means for plotting said computed tomography number of said selected tissue and said computed tomography number representing a second tissue on one coordinate axis of a reference graph, and further comprising means for plotting known values of a physical parameter of said selected and second tissues on a second coordinate axis of said reference graph in order to obtain a reference line which can be used to find unknown values of said physical parameter according to computed tomography number.

20. A system as claimed in claim 19, wherein said physical parameter is density.

* * * * *